June 17, 1958 J. C. LOZIER 2,839,727
ENCODER FOR PULSE CODE MODULATION
Filed Feb. 11, 1953 4 Sheets-Sheet 1

REFLECTED BINARY CODE

CONVENTIONAL BINARY CODE

INVENTOR
J. C. LOZIER
BY N. S. Ewing
ATTORNEY

ENCODER FOR PULSE CODE MODULATION

Filed Feb. 11, 1953 4 Sheets-Sheet 2

INVENTOR
J. C. LOZIER
BY N. S. Ewing
ATTORNEY

ENCODER FOR PULSE CODE MODULATION

Filed Feb. 11, 1953 4 Sheets-Sheet 3

INVENTOR
J. C. LOZIER
BY N. S. Ewing
ATTORNEY

INVENTOR
J. C. LOZIER
BY N. S. Ewing
ATTORNEY

United States Patent Office 2,839,727
Patented June 17, 1958

2,839,727

ENCODER FOR PULSE CODE MODULATION

John C. Lozier, Short Hills, N. J., assignor to Bell Telephone Laboratories, Incorporated, New York, N. Y., a corporation of New York Application February 11, 1953, Serial No. 336,277

16 Claims. (Cl. 332—1)

This invention relates to encoders for pulse code modulation systems of communication.

In communication systems utilizing pulse code modulation, the instantaneous amplitude of a signal wave to be transmitted, such as a speech or other message wave, is recurrently sampled, and the resulting amplitude samples are represented by permutation code groups of pulses of a fixed number of code elements in accordance with a particular code. Binary codes are particularly advantageous since each code element may have but one of two values; a satisfactory way to represent these two values for transmission purposes is to represent one value by the presence of a pulse in the assigned pulse position, i. e., an "on" pulse, and the other value by the absence of a pulse, i. e., an "off" pulse. Further, it is convenient to use "on" pulses for the "1's" and "off" pulses for the "0's."

At least two types of binary codes are known and employed in pulse code modulation systems. One of these, temed the conventional binary code, follows the binary scale of notation. Each code group in accordance with this code is an arithmetic representation of an instantaneous amplitude of the message wave and may be readily decoded since each code element or digit of a code group represents a certain component of the total amplitude represented by the group. The digits are, in fact, weighted as successive integral powers of 2:$2^0$, $2^1$, $2^2$ . . . $2^{n-1}$, where $n$ is the number of code elements in each code group. A system of decoding which utilizes this property of the conventional binary code is described in Patent 2,514,671 to A. J. Rack, dated July 11, 1950, and also in an article in the Bell System Technical Journal for January 1948, entitled "An experimental multichannel pulse code modulation system of toll quality," particularly on pages 36 through 38.

Although the conventional binary code is particularly advantageous from a decoding standpoint, it has certain disadvantages in the coding process. Briefly, a difference in one quantized level in many cases requires a change in as many as all digits, thereby inducing coding errors. This property of the code makes quantization of the input signal prior to encoding necessary in most cases to prevent large coding errors.

This disadvantage is overcome by the use of another binary code, termed, from the manner in whch it may be constructed, the reflected binary code. This code is described in an application of F. Gray, Serial No. 785,697, filed November 13, 1947 which issued as Patent 2,632,058, dated March 19, 1953. Reflected binary code groups representing successive amplitudes differ in only one code element so that an encoding error in any one element will result in an error in the decoded signal of no more than one quantum step. Although it is more difficult to decode reflected code groups directly, since the digits do not have the same or a similar simple significance as the code elements of the conventional binary code, it is possible to translate reflected binary code groups into corresponding conventional binary code groups by relatively simple apparatus prior to decoding. An overall efficient and accurate system may therefore be designed which encodes the message wave in the reflected binary code and then translates into the conventional binary code at some time prior to decoding; see, for example, R. L. Carbrey Patent 2,571,680, dated October 16, 1951, or an application of R. E. Yaeger, Serial No. 255,823, filed November 10, 1951, which issued as Patent 2,758,788 dated August 14, 1956.

In general, the objects of the present invention relate to improved methods and apparatus of encoding a signal wave in pulse code. A more particular object of the invention is a speedy pulse coder and, more particularly, one which can produce all digits of each code group simultaneously, i. e., a "simultaneous" encoder.

Another object of the invention is to translate a frequency modulated signal into permutation code groups of pulses.

It is also an object of the invention to simplify the apparatus required to encode a signal wave in a pulse code.

In accordance with an illustrative embodiment of the invention which is described below in more detail, the instantaneous amplitude of a signal wave to be transmitted is recurrently sampled. This process produces a train of "pulse amplitude modulated" (PAM) pulses. These pulses modulate the output of a frequency modulation oscillator, thereby producing a train of "pulse frequency modulated" (PFM) pulses whose center freqencies deviate from a reference by an amount proportional to the instantaneous amplitude of the signal wave. The coder itself to which this latter train of pulses is applied comprises a plurality of frequency selective parallel paths, one for each digit of the code employed, and each having an acceptance only for input energy whose center frequency, for that digit, represents a signal having an amplitude within a range encoded "1." Code groups representative of the instantaneous amplitude of the input signal appear in parallel at the outputs of the parallel paths and may be transmitted in parallel form or may be translated into sequential form for transmission.

Although the invention is not limited to the use of a particular code, the use of the reflected binary code permits economies of apparatus in addition to the coding advantages described above. For digits other than the most significant digit, the reflected code has just one half as many discrete amplitude ranges encoded "1" as does the conventional binary code. Therefore, if a filter is used to define or represent each of these discrete ranges, one half as many filters plus one will be required to synthesize the code pattern. Also, the use of the reflected code creates a symmetry for all digits except the most significant digit about a center frequency.

In accordance with further principles of the invention, the number of filters required for any digit can be decreased by amplitude modulating one or more carriers with the frequency modulated pulses, thereby creating sidebands which, by proper selection of the modulated carrier frequency, fall within the pass bands of a few filters so that one filter is not required for each and every discrete amplitude range encoded "1." Although the code pattern of each digit of the conventional binary code also has a symmetry about a center frequency, these center frequencies differ for each digit so that the carrier or carriers for each digit would have to be separately derived.

A feature of the invention is the high speed of encoding which is possible irrespective of the number of digits employed. Theoretically, the speed of encoding is limited only by the response time of the frequency sensitive coder. Another feature of the invention is that special coding tubes, binary counters, comparator networks, such as required by many prior art systems, are rendered unnecessary since encoding, as taught by the present invention, may be achieved by simple filter networks.

These and other features and objects of the invention may be more fully understood from a consideration of the following detailed description when read in accordance with the attached drawings, in which:

Figs. 1A and 1B illustrate the patterns of the reflected binary code and the conventional binary code, respectively, as they might appear on a coding mask in a coder of the type described in an article entitled "Electron beam deflected tubes for pulse code modulation," by R. W. Sears, Bell System Technical Journal, January 1948, pages 44 through 47;

Figure 5:
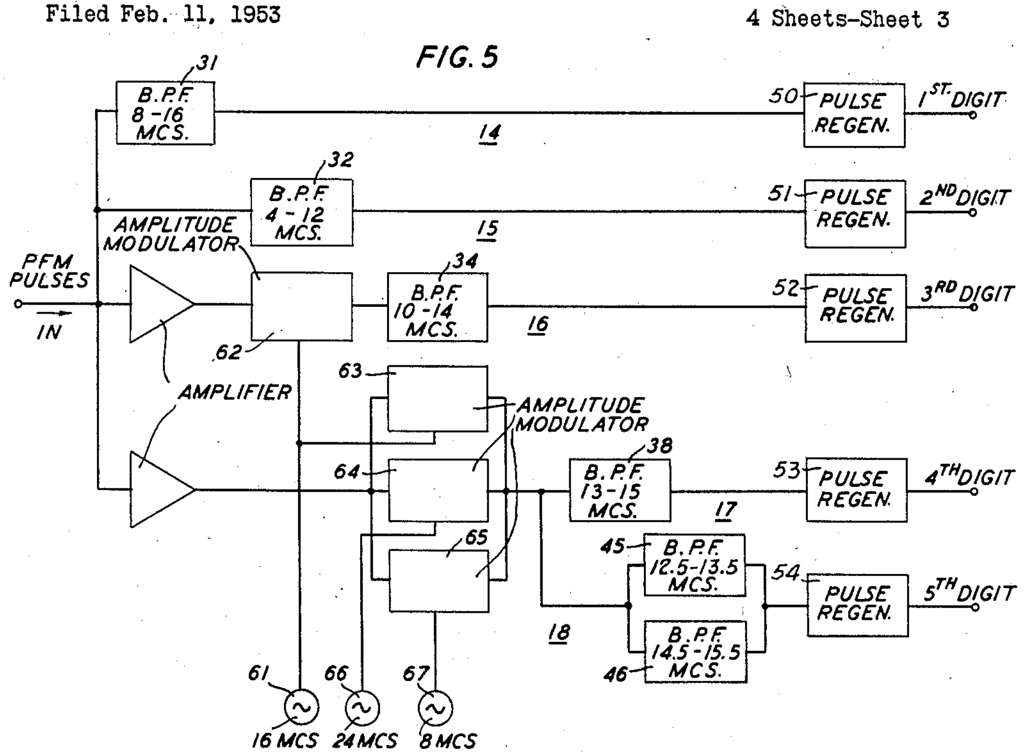
Figure 6:
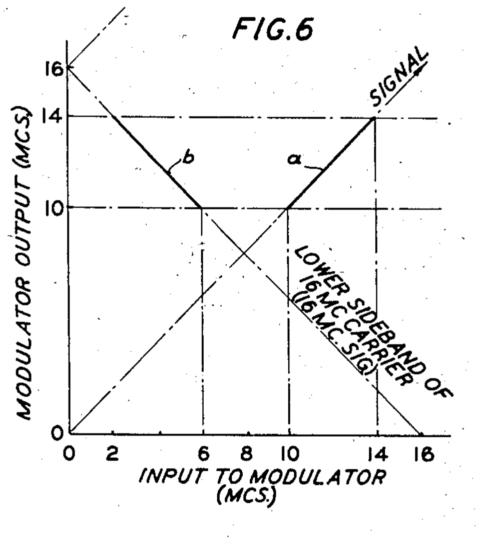
Figure 7:
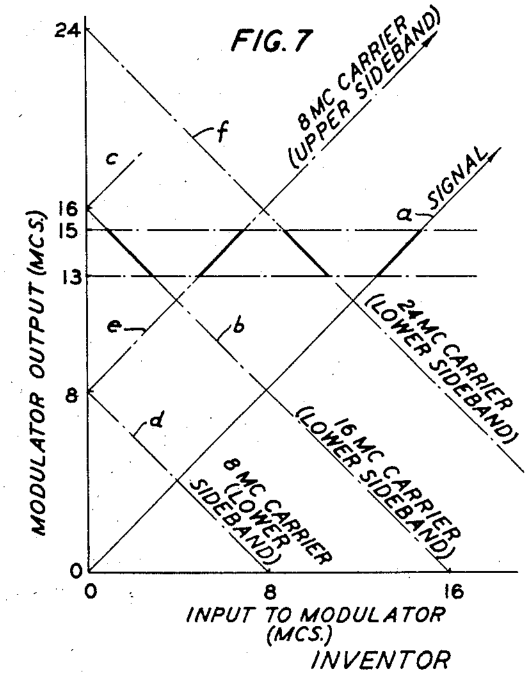
Figure 8:
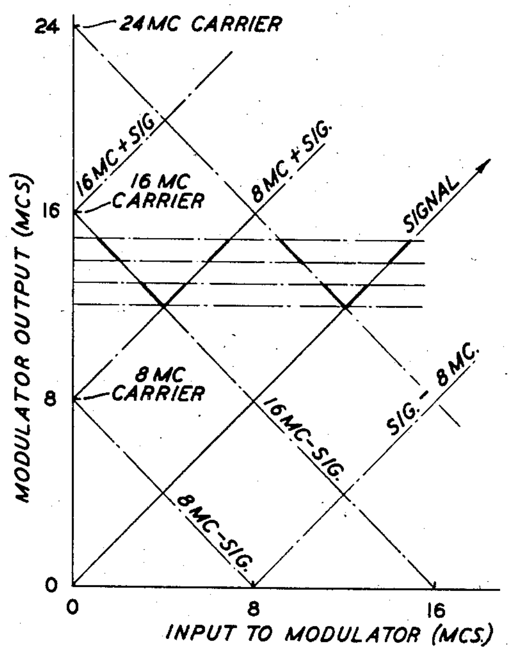
Figure 9:
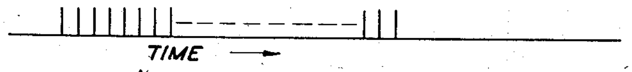
Figure 10:
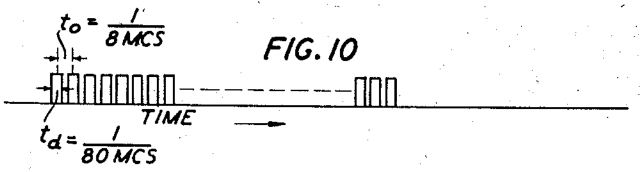
Figure 11:
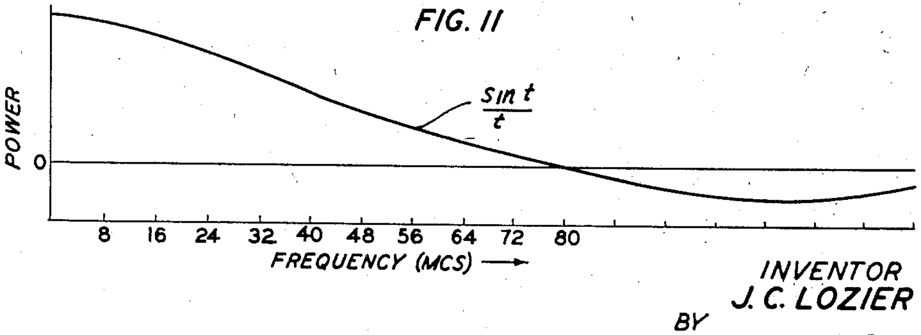

Figs. 6, 7, and 8 are diagrams illustrating the operation of the encoder of Fig. 5; and Figs. 9, 10, and 11 illustrate a manner of modulation proposed for a coder of the type illustrated by Fig. 5.

Figure 1A:
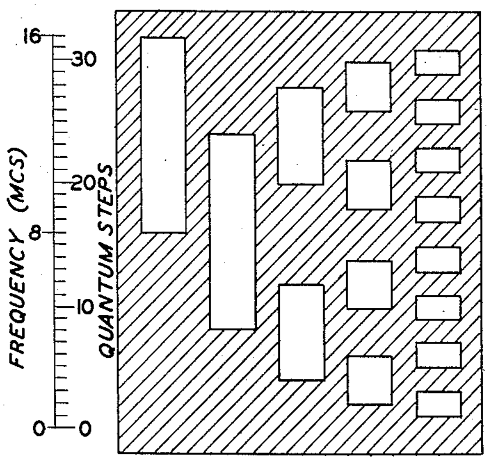
Figure 1B:
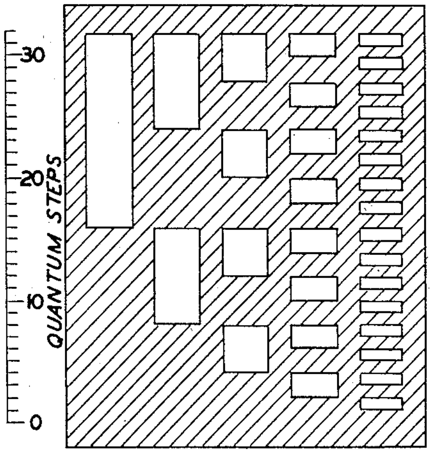

The reflected and conventional binary codes are illustrated by Figs. 1A and 1B. Coding masks usable in systems of the type described in the Sears article mentioned above have been chosen to illustrate the patterns of these two codes, five-digit codes being used in each example.

Each mask is divided into five vertical columns. Each column represents the binary character of one of the digits; the significance of the digital representations increases from right to left. The slots in each column represent the binary "1" and the absence of a slot represents binary "0." The codes are read horizontally; in the Sears type coder, an electron beam is deflected vertically by an amount proportional to the amplitude of a signal sample and then deflected horizontally to read the code at that quantum level. In a flash coder of the type described in an application of W. M. Goodall, Serial No. 37,035, filed July 3, 1948, which issued as Patent 2,616,060 on October 28, 1952, a beam which spans all the digital columns reads all code elements simultaneously at the level representative of the signal sample amplitude.

Since there are $2^5$ or 32 permutations of "1" and "0" available, a five-digit binary code can recognize 32 discrete amplitudes. Obviously, more discrete amplitudes can be recognized by employing more digits in the code. These 32 discrete amplitudes, called quantum steps, are indicated on the scales to the left of Figs. 1A and 1B. Reading successive code groups vertically, it can be seen that the standard or conventional binary pattern is followed by the mask of Fig. 1B. Further, by examining the pattern created by the slots in the mask of Fig. 1A and ignoring the most significant digital slot, it can be seen that the code pattern is symmetrical about a center horizontal axis, making the top part of the pattern a "reflection" of the lower part and giving rise to the name employed to designate this code. It can also be seen that at each quantum step boundary, the code changes in one and only one digit. This is a characteristic of the reflected binary code that makes its use advantageous for coding purposes.

Figure 2:
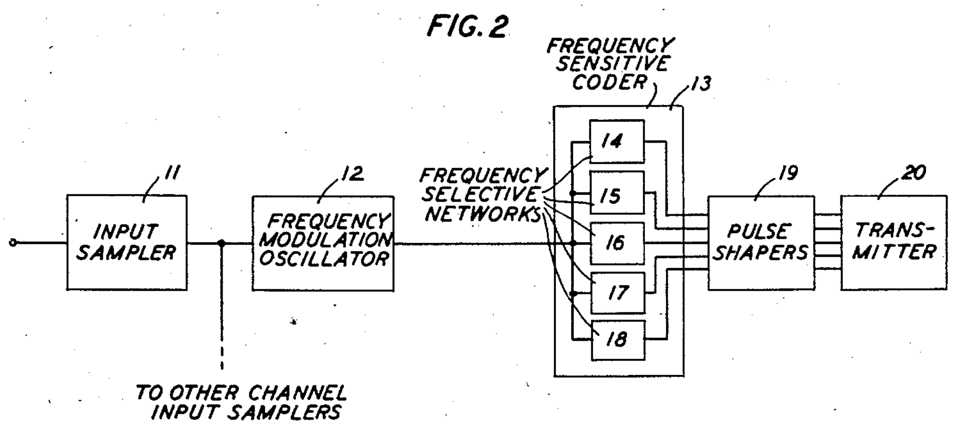
Fig. 2 is a block schematic diagram of an encoder embodying principles of the present invention.

An encoding system embodying principles of the present invention is functionally illustrated by Fig. 2. The input signal or message wave is applied to a sampler 11 which, for example, by gating, recurrently samples the instantaneous amplitude of the signal wave and produces at its output a train of "pulse amplitude modulated" (PAM) pulses. This trains of PAM pulses is applied to a frequency modulation oscillator 12 to modulate, linearly, its output frequency as a function of the amplitude of the pulses in the train. The output of the oscillator is, therefore, a train of pulses whose center frequencies deviate from a reference frequency by an amount proportional to the instantaneous amplitude of the input signal samples, i. e., "pulse frequency modulated" (PFM) pulses. In the present illustrative embodiment, the unmodulated output of this oscillator is 8 megacycles and the modulated output is 8±8 megacycles.

Coding is accomplished by a frequency sensitive coder 13 which synthesizes the code pattern of the code employed by frequency selective networks such as filters. In one embodiment employing the reflected binary code, a plurality of frequency selective paths 14–18, one for each digit, are connected in parallel. Each path has an acceptance only for input energy whose frequency corresponds to a signal which, for that digit, is represented by the binary "1." The required acceptance bands for each path may be obtained from the frequency scale to the left of Fig. 1A. For example, path 14, representing the most significant digit, has a pass band of 8 to 16 megacycles and rejects frequencies outside this band. Path 15 accepts signals from 4 to 12 megacycles and rejects all others. Path 16 accepts signals in the bands 10 to 14 megacycles and 2 to 6 megacycles, etc.

The frequency modulated pulses are applied to all paths, and it will be apparent that a code group of "on-off" pulses will appear at the five outputs of the coder for each input pulse. Further, the code elements appear at these outputs substantially simultaneously, and the time required for the coder to operate is limited only by the transient response of the frequency selective networks having the narrowest bands. The pulses delivered by the coder are passed through pulse shaping means 19 which, for example, by gating and slicing, standardize the code element pulses for transmission by the transmitter 20. The code element pulses may be transmitted in parallel, for example, on adjacent carriers, or may be transmitted sequentially, depending on whether considerations of time or frequency spectrum are the more important. Additional channels may be inserted ahead of the oscillator 12 in a multiplex manner.

To illustrate a practical system, a five-digit coder for handling 24 channels with a sampling rate of 8000 per second will be described; the reflected binary code will be employed. An 8-kilocycle sampling rate makes 125 microseconds available between successive samples of a single channel. With 24 channels, $$\frac{125}{24}$$

or 5.2 microseconds are available between transmitted samples. For the present it will be assumed that the narrowest filters should have a band width of one megacycle. The narrowest filters are those required for the least significant digit. With the reflected binary code, these narrowest filters are two quantum steps wide, as shown in Fig. 1A. This may be compared with the conventional binary code, Fig. 1B, wherein the narrowest filters required would be one quantum step wide. Therefore, each quantum step should be half a megacycle wide so that for a five-digit coder the 32 quantum steps require a 16-megacycle frequency swing.

Figure 3:
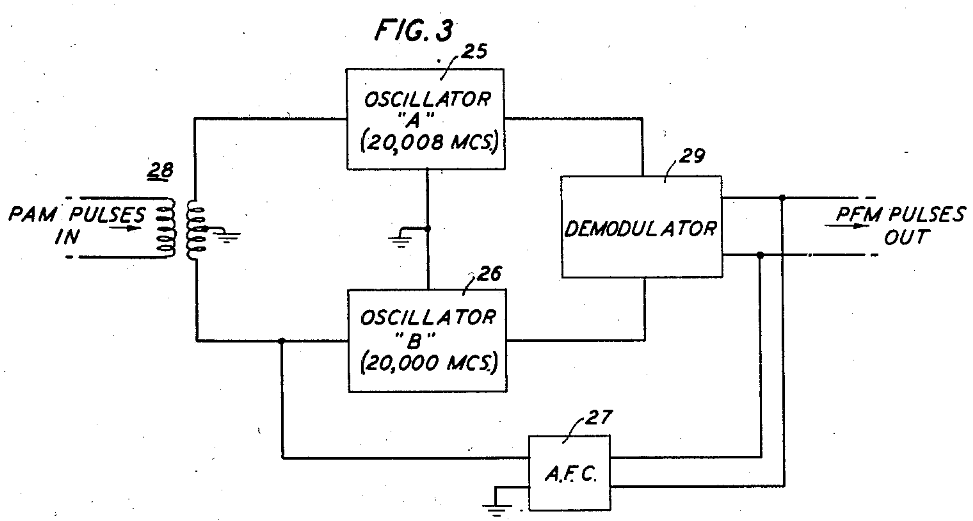
Fig. 3 illustrates a frequency modulation oscillator which may be employed in the encoder illustrated by Fig. 2.

In accordance with principles of the invention, the necessary frequency swing is obtained in a convenient form by frequency modulating a pair of very high frequency oscillators 25 and 26 in push-pull, as illustrated in Fig. 3. These oscillators, which may, for example, be klystron-type devices, are tuned in the absence of input signals to 20,008 and 20,000 megacycles, respectively. In the absence of an input signal, the oscillators are held 8 megacycles apart by the automatic frequency control network 27 which may be conventional in form and which applies a control voltage to a frequency sensitive element in one of the oscillators, e. g., 26. The input PAM pulses are applied in a push-pull manner to frequency sensitive elements of the two oscillators, for example, to the repellers of klystron oscillators by way of transformer 28. The positive and negative PAM samples swing the oscillators 25 and 26 ±4 megacycles and ∓4 megacycles, respectively, so that the frequency difference of the oscillator outputs goes from zero to 16 megacycles for the 32 quantum steps. The outputs of the two oscillators are demodulated against each other by demodulator 29 to obtain this difference frequency. The output of the demodulator is a train of PFM pulses whose center frequencies are 8±8 megacycles.

Figure 4:
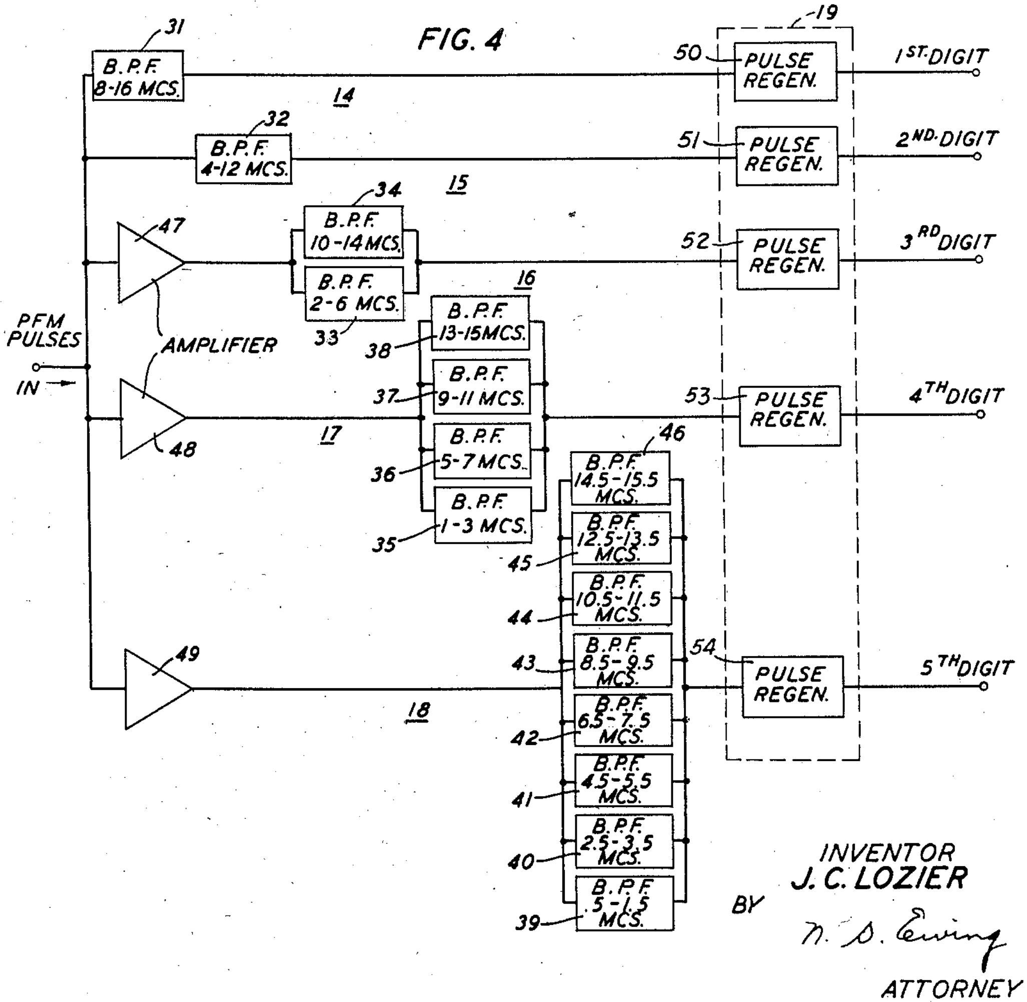
Figs. 4 and 5 illustrate two embodiments of a frequency sensitive encoder embodying principles of the present invention.

Fig. 4 illustrates a relatively simple frequency sensitive coder in accordance with principles of the invention. The purpose of this coder is to divide the total band spanned by the frequency swing of the input frequency modulated signal into quantum frequency bands and to represent signals within each of these bands by a unique permutation group of a fixed number of code elements comprising "off/on" pulses in accordance with the reflected binary code.

The frequency modulated signal derived by the demodulator, Fig. 3, is applied to the five parallel paths 14–18 each containing band pass filters which synthesize the code pattern of the reflected binary code illustrated in Fig. 1A. The first digit, i. e., the most significant digit, is derived by a single filter having a pass band of 8 to 16 megacycles. The second digit is also derived by a single filter 32, this one having a pass band of 4 to 12 megacycles. Two filters 33 and 34 connected in parallel, one having a pass band of 2 to 6 megacycles and the other 10 to 14 megacycles, are required to derive the third digit. The fourth digit requires four filters 35–38 having pass bands corresponding to the quantum frequency bands which, for the fourth digit, are represented by the binary "1," and the fifth digit requires 8 filters 39–46. Gain is provided by the amplifiers 47–49 for the third, fourth, and fifth digits. Pulse regenerators 50–54, which may be of known design, are connected in the output of each parallel path to standardize the pulses both as to wave shape and as to timing. Delay elements may be inserted in each path, as needed, to equalize the delay in the paths.

The number of filters required can be reduced by employing other principles of the invention illustrated by Fig. 5. As in Fig. 4, the first and second digits are each obtained by a single filter 31 and 32, respectively. It may be noted that the first digit merely indicates the polarity of the signal. To produce the third digit, two filters having pass bands of 2 to 6 and 10 to 14 megacycles, respectively, were required in the Fig. 4 embodiment. In the Fig. 5 embodiment, however, the symmetry of the reflected code pattern is utilized to reduce this requirement to one filter 34.

A 16-megacycle carrier supplied from a source 61 is amplitude modulated by the 8±8 megacycle signal in the third digit path by means of the amplitude modulator 62. As the signal goes from zero to 16 megacycles, a lower sideband of 16 to zero megacycles will be produced by this modulation process. This lower sideband and the original signal, an appreciable component of which will appear at the modulator 62 output, are then applied to a single filter 34 having a pass band of 10 to 14 megacycles. If the input signal is in the band 10 to 14 megacycles, it will be transmitted by the filter 34. If it is in the band of 2 to 6 megacycles, the 16-megacycle carrier will have a lower sideband of 14 to 10 megacycles, which will similarly be transmitted by the filter. Fig. 6 illustrates this modulation process. Curve *a* represents the signal and curve *b* the lower sideband. It will be obvious from this diagram that a single 2 to 6 megacycle filter could be used instead of the 10 to 14 megacycle filter.

In a similar manner, the filter requirement for the fourth digit can be reduced from 4 to 2 band pass filters and that of the fifth digit from 8 to 4 band pass filters by this one modulation of a 16-megacycle carrier. However, the frequency patterns of the fourth and fifth digits of the reflected binary code have a further symmetry, in the illustrative embodiment, at 4 and 12 megacycles. Therefore, a second amplitude modulation process may be employed in which the original signal of 8±8 megacycles amplitude modulates carriers of 8, 16, and 24 megacycles.

This modulation for the fourth digit is accomplished by three amplitude modulators 63–65 to which the 16, 24, and 8 megacycle carriers supplied by sources 61, 66, and 67, respectively, are applied. The combination of the original signal plus the sidebands resulting from each of these modulation processes permits halving of the number of filters required for the fourth and fifth digits. In other words, it is necessary to build only one quarter of the code mask beyond the third digit provided the original signal of 8±8 megacycles and the lower sidebands of the 8, 16, and 24 megacycle carriers are used. Each of these carriers may be derived from a common source, being harmonics of 8 megacycles, and may, for example, be derived from the pair of oscillators 25 and 26 illustrated in Fig. 3.

Fig. 7 illustrates how the combination of the signal and the sidebands criss-cross the frequency range from 12 to 16 megacycles as the signal goes from zero to 16 megacycles so that the fourth digit coding mask which should accept signals of from 1 to 3, 5 to 7, 9 to 11, and 13 to 15 megacycles can do just that with one filter 38 having a pass band from 13 to 15 megacycles. Curve *a* again represents the signal in Fig. 7, curves *b* and *c* the lower and upper sidebands of the 16-megacycle carrier, curves *d* and *e* the lower and upper sidebands of the 8-megacycle carrier, and curve *f* the lower sideband of the 24-megacycle carrier. With these three stages of modulation, the fifth digit requires two filters 45 and 46 one with a pass band of 12.5 to 13.5 megacycles and the other with a pass band of 14.5 to 15.5 megacycles. This is illustrated by the diagram of Fig. 8. The fifth digit may be encoded with one filter by adding one more modulator and two more carriers if practical considerations permit.

The coder just described employs one modulator for each amplitude modulation process. A single modulator will suffice in some cases by inserting the requisite carrier frequencies directly into a single modulator. In this manner, for example, the three modulators 63, 64, and 65 could be replaced by a single modulator, e. g., modulator 64, into which all three carriers are inserted.

Alternatively, the single modulator could be operated on a pulse basis rather than on a continuous carrier basis. For example, a train of narrow pulses with a repetition rate of 8 megacycles, as illustrated in Fig. 9, will produce as a carrier a modulated spectrum about 8 megacycles and all harmonics thereof. This would be rather inefficient, however, from a power standpoint if only the second and third harmonics are required. This efficiency may be improved, however, by confining most of the power to the desired carrier frequencies by giving the pulses a finite width; for example, if the pulse width $t_d$ were made one tenth of the repetition rate, $1/t_0$ as illustrated by Fig. 10, the spectrum of the pulse train would be concentrated in the lower five harmonics, as illustrated in Fig. 11. The curve illustrated in this figure is of the form $$\frac{\sin x}{x}$$

Utilizing this principle, the three modulators 63, 64, and 65 of Fig. 5 could be replaced by a single modulator fed by a pulse carrier of the type illustrated in Fig. 10.

*Filter requirements*

The controlling factor in determining the maximum speed at which a frequency modulation coder of the type described can be operated is the intersymbol interference between the envelopes of successive frequency modulated pulses in the code mask filters and associated envelope rectifiers. At this point in the system, however, the pulses are received at the relatively low channel sampling rate, and the tolerance on intersymbol interference in the various digit filters is a relatively lenient one for pulse code modulation digits.

As mentioned above, in the 24-channel coder there are 5.2 microseconds between successive PAM pulses. In theory, the intersymbol interference requirements for pulse code modulation is simply that the response to all previous digits be more than 6 db down. Twelve db down, however, is a more practical figure. This requirement is based on the fact that PCM signals can be regenerated, since all that is necessary at a receiver or a regenerator is to determine whether or not each digit is present.

From the standpoint of steady-state frequency discrimination, the filter requirement is similar in that pulses of the wrong frequency should also be suppressed by at least 12 db. This means that the steady-state frequency characteristic for each filter should be 6 db down at the edge of the pass band and 12 db down within one quantum step in frequency beyond the edges of the pass band.

With a 12 db limit on allowable intersymbol interference and a 12 db steady-state suppression requirement on the attenuation one quantum step in frequency from the cut-off of the various filters, the question then becomes one of how much band width is required in such filters in order that the system be able to code a symbol every 5.2 microseconds. For the purpose of the present invention, it is believed sufficient to state merely that the sharper the cut-off the better.

To estimate the order of magnitude of the band width required, the familiar rule of thumb for the characteristic of gaussian shaped filters can be used, namely, that the pulsed response of a band pass filter will rise from 10 to 90 percent of its peak value in approximately $1/f_d$, where $f_d$ is the total band width between the 6 db down points. On such a basis, a one megacycle band width, assumed above for the narrowest filters, would have a rise time of one microsecond. A two megacycle rise time will be assumed, however, in order to simplify filter design and to allow for the fact that the carrier frequency of the pulses may come at the edges of the filters. The decay time will be somewhat greater than the rise time unless the filters are first equalized but can also be assumed as two microseconds.

It will be necessary to store each PAM pulse for a period at least as long as the rise time to permit the filter output amplitude to build up to approximately its steady-state value. But this storage time will not appreciably lengthen the pulse response of the filter since the applied pulse length adds in quadrature to the sum of the rise and decay times. The maximum length of the output envelope would therefore be $$\sqrt{2^2+(2+2)^2}$$

or 4.5 microseconds.

In practice, only the decay time of the pulses need be considered to determine the time available, since the output sampling rate, like the input sampling rate, would be 5.2 microseconds, and the circuit should be arranged to sample at the output response peaks. Allowing an additional half microsecond for the envelope detector decay brings the total estimated decay time to 2.75 microseconds. This estimate represents a filter readily obtainable in practice and, therefore, justifies the one megacycle band assumed above for the width of the narrowest filter.

Although a five-digit coder has been described, principles of the invention may be obviously applied to coders employing greater numbers of digits. A greater number of digits will, of course, require a greater frequency swing of the high frequency oscillators and also a greater number of amplitude modulation processes if the number of filters is to be kept small. For example, an eight-digit coder can recognize 256 quantum steps. Using a reflected binary code wherein the smallest filters are two quantum steps wide, the required frequency swing of the high frequency oscillators would be 128 megacycles. Employing two amplitude modulation processes, one modulating the third and fourth digit signals on a single carrier of 128 megacycles and one modulating the signals applied to the fifth-eighth digit filters on four carriers of 32, 64, 76, and 128 megacycles, the number of filters required would be one each for the first three digits, two filters for the fourth digit, and one, two, four, and eight for the fifth, sixth, seventh, and eighth digits, respectively. This number of filters can be reduced as taught above by further amplitude modulation steps. In theory at least, the filter requirements could be reduced to a minimum of eight filters, one for each digit, by using six successive stages of modulation each with a single carrier frequency. This, however, will not be practical in many cases. Other applications of the principles of the invention, as well as modifications of the embodiments described, will be readily apparent to one skilled in the art so that the invention should not be deemed limited to the methods and apparatus specifically disclosed and described.

What is claimed is:

1. Encoding apparatus for representing instantaneous amplitudes of a signal wave by permutation pulse code groups of a fixed number of code elements in accordance with a digital code, said apparatus comprising means for recurrently sampling the instantaneous amplitude of said signal, a source of oscillatory energy, means for modulating the frequency of said energy as a function of said sampled amplitudes, coding means connected to receive the energy frequency modulated by said last-named means, said coding means comprising a plurality of parallel paths each having band-pass filter characteristics, one for each of said code elements, and each having an acceptance only for energy modulated by signals lying within an amplitude range which, for that code element, is represented by a code element of a particular kind, and means for deriving said permutation code groups from the outputs of said paths.

2. The combination in accordance with claim 1 wherein said source of oscillatory energy comprises a pair of high frequency oscillators tuned, in the absence of modulating signals, to different frequencies and each having means for controlling the frequency of its output, and said means for modulating the frequency of said energy comprises means for applying said sampled amplitudes to said frequency controlling means in a push-pull manner and the further combination of converter means for deriving a wave of the difference frequency of two input waves, means for applying the outputs of said oscillators to said converter means, and means for applying the output of said converter to the input of said coder means.

3. The combination in accordance with claim 2 wherein said oscillators are tuned, in the absence of modulating signals, to frequencies which differ by an amount approximately equal to one half the desired maximum frequency swing.

4. Means for encoding a signal wave in an n-digit permutation code comprising means for converting said signal wave into a train of pulses amplitude modulated in accordance with the amplitude of said signal wave, oscillator means, modulation means to vary the output frequency of said oscillator means, means for applying said train of amplitude modulated pulses to said modulation means, $n$ parallel-connected band pass filtering means, said each of said $n$ filtering means corresponding to one of the digits of said code and having a passband acceptance only for frequencies representing signals which fall within an amplitude range encoded, for that digit, by a digit of a first kind, means for applying the modulated output of said oscillator means to said filtering means, and means for deriving code groups of pulses from the output of said filtering means.

5. Apparatus for representing a signal wave by permutation code groups of bivalued pulses in accordance with an n-digit binary code, where *n* is an integer greater than one, comprising means for sampling the instantaneous amplitude of said signal wave at recurrent intervals, oscillator means, means for frequency modulating the output of said oscillator means in accordance with the amplitude of said samples, *n* frequency selective parallel transmission paths, each of said paths corresponding to one of the digits of said code and having an acceptance only for input energy whose frequency, for that digit, corresponds to a signal sample having an amplitude within a range represented by a pulse of a first value, means for applying said modulated oscillator output to said parallel paths, and means for deriving said groups of bivalued pulses from said parallel paths.

6. Means for translating a signal wave into groups of pulses in accordance with a binary code comprising means for sampling the amplitude of said signal wave at recurrent intervals, frequency modulation oscillator means, means for modulating the output frequency of said oscillator means comprising means for applying the samples derived by said sampling to said oscillator means, a frequency selective coder having a plurality of transmission paths each having band-pass filter characteristics, means for applying the output of said frequency modulation oscillator means to said coder, and means for deriving said groups of pulses from said coder.

7. Means for encoding a signal wave in a digital code comprising gating means for deriving a train of amplitude modulated pulses from said signal, means for deriving from said train of amplitude modulated pulses a train of frequency modulated pulses, for the center frequencies of which deviate from a reference frequency by an amount proportional to the amplitude of the amplitude modulated pulses from which they were derived, frequency sensitive means representing the digital character of each of the digits of said code, said frequency sensitive means comprising a plurality of transmission paths each having band-pass filter characteristics, means for applying said frequency modulated pulses to said frequency sensitive means, and means for deriving from said frequency sensitive means a code group of pulses in response to the application thereto of each of said frequency modulated pulses.

8. An encoder for representing a frequency modulated signal by permutation code groups of a fixed number of code elements in accordance with a binary code, said coder comprising an input, a path for each of said code elements connected at one end to said input, means for applying said frequency modulated signal to said input, frequency selective means in each of said paths having pass bands which accept only input signals which, for that code element, are represented by code elements of a first kind, a local oscillator, an amplitude modulator in at least one of said paths ahead of its frequency selective means for modulating the output of said oscillator as a function of said frequency modulated signal, and output means for deriving said code groups from the other ends of said paths.

9. Apparatus for translating a frequency modulated signal into permutation code groups, of a fixed number of code elements, of bivalued pulses in accordance with a binary code, each of said permutation code groups representing a unique quantum band of frequencies within the total band spanned by the maximum frequency swing of said signal, said apparatus comprising a path for each element of said code, means for applying said frequency modulated signal to the input of each of said paths, frequency selective means in each of said paths passing only those applied signals the frequency of which lies within a quantum band requiring, for that code element, a pulse of a first value, and means for deriving said code group pulses from the outputs of said paths.

10. Apparatus for translating a frequency modulated signal into permutation code groups, of a fixed number of code elements, of bivalued pulses in accordance with a binary code, each of said permutation code groups representing a unique quantum band of frequencies within the total band spanned by the maximum frequency swing of said signal, said apparatus comprising a path for each element of said code, means for applying said frequency modulated signal to the input of each of said paths, frequency selective means in each of said paths passing only those applied signals the frequency of which lies within a quantum band requiring, for that code element, a pulse of a first value, said frequency selective means in at least one of said paths passing only signals the frequency of which lies in one-half of said total band and is within a quantum band requiring, for that code element, a pulse of a first kind, a source of oscillatory energy, means for amplitude modulating said energy with the signal applied to said at least one path, means for applying said signal and one of the sidebands resulting from the amplitude modulation to said last-named frequency selective means, and means for deriving said code group pulses from the outputs of said paths.

11. The combination in accordance with claim 10 wherein said oscillatory energy has a frequency to produce, as a result of said amplitude modulation process, a sideband which, with reference to the center frequency of said total band, is an image of said signal.

12. The combination in accordance with claim 10 wherein at least a second of said paths accepts only signal frequencies over one quarter of said total band which lie within a quantum band requiring for that code element a pulse of a first value, and the further combination of amplitude modulation means for producing a pair of sidebands which fall within said one quarter of said total band in response to input signals of frequencies lying outside said one-quarter band, means for applying said frequency modulated signal to said last-named amplitude modulation means, and means for applying said pair of sidebands and said frequency modulated signal to said last-named frequency selective means.

13. Apparatus for translating a frequency modulated signal into permutation code groups of a fixed number of code elements in accordance with the reflected binary code, said permutation code groups each representing a unique quantum band of frequencies within the total band spanned by the maximum frequency swing of said frequency modulated signal, said apparatus comprising a first and a second filtering means each having a pass band substantially coextensive with the quantum bands which require, for the most and next most significant code elements, respectively, a code element of a first kind, filtering means for each of the remaining code elements each having pass bands substantially coextensive with the quantum bands which lie within a fraction $1/l$ of said total band, where $l$ is an even integer, and which require, for their respective code elements, a code element of said first kind, frequency conversion means for each of said remaining code elements responsive to signals of a frequency which lie outside said fraction of said total band but within a quantum band which requires, for that code element, a code element of a first kind, for producing a signal of a frequency within a quantum band which lies within said fraction of said total band, means for applying said frequency modulated signals to each of said filtering means and to said signal responsive means, means for also applying the outputs of said signal responsive means to their associated filtering means, and means for deriving code element representing signals from the outputs of said filtering means.

14. Apparatus for encoding a frequency modulated signal in *n* digit permutation code groups of binary "1" and binary "0" code pulses, each of said permutation code groups representing a unique quantum band of frequencies within the maximum frequency swing of said frequency modulated signal, said apparatus comprising a path for each of said digits, passband filtering means associated with each of said digit paths, the filtering means associated with each path passing only frequencies within a quantum band encoded "1" in its associated digit position, means for applying said frequency modulated signal to said paths in parallel, means for deriving said binary code pulses from the outputs of said paths, and said passband filtering means for one of said digit paths comprising a filter having a passband substantially coextensive with one of the quantum bands encoded "1" for said one digit, and frequency translating means for translating input signals whose frequency falls within a second quantum band encoded "1" for said one digit to fall within the passband of said filter.

15. The combination in accordance with claim 14 wherein said last-named means comprise a source of carrier waves and amplitude modulator means for producing upper and lower sidebands of said carrier waves, one of which falls within the said passband of said filter.

16. Apparatus for translating a frequency modulated signal into permutation code groups, of a fixed number of code elements, of bivalued pulses in accordance with a binary code, each of said permutation code groups representing a unique quantum band of frequencies within the total band spanned by the maximum frequency swing of said signal, said code requiring for at least one of said code elements similarly valued pulses for at least two of said quantum bands, said apparatus comprising a path for each element of said code, means for applying said frequency modulated signal to the input of each of said paths, frequency selective means in each of said paths passing only those applied signals the frequency of which lies within a quantum band requiring, for that code element, a pulse of a first value, said frequency selective means in the path associated with said one code element passing only frequencies within one of said two quantum bands, a source of carrier waves, means for amplitude modulating said waves by said frequency modulated signal to produce a pair of signal sidebands, means for applying said signal and one of said sidebands to said frequency selective means in said one path, and means for deriving said code group pulses from the outputs of said paths.

References Cited in the file of this patent

UNITED STATES PATENTS

| | | |
|---|---|---|
| 2,408,692 | Shore | Oct. 1, 1946 |
| 2,476,162 | Thompson | July 12, 1949 |
| 2,560,434 | Gloess et al. | July 12, 1951 |
| 2,570,220 | Earp et al. | Oct. 9, 1951 |
| 2,602,158 | Carbrey | July 1, 1952 |